United States Patent
Xia et al.

(10) Patent No.: US 12,035,245 B2
(45) Date of Patent: Jul. 9, 2024

(54) METHOD FOR CONTROLLING POWER CONSUMPTION OF TERMINAL, AND STORAGE MEDIUM

(71) Applicant: GUANGDONG OPPO MOBILE TELECOMMUNICATIONS CORP., LTD., Guangdong (CN)

(72) Inventors: Yang Xia, Guangdong (CN); Tao Zhang, Guangdong (CN); Kai Tang, Guangdong (CN); Yunteng Zhuang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 273 days.

(21) Appl. No.: 17/526,752

(22) Filed: Nov. 15, 2021

(65) Prior Publication Data
US 2022/0078703 A1   Mar. 10, 2022

Related U.S. Application Data

(63) Continuation of application No. PCT/CN2020/086163, filed on Apr. 22, 2020.

(30) Foreign Application Priority Data

May 16, 2019 (CN) .......................... 201910405971.7
Sep. 16, 2019 (CN) .......................... 201910872915.4

(51) Int. Cl.
*H04W 52/02* (2009.01)
*H04L 1/00* (2006.01)
(Continued)

(52) U.S. Cl.
CPC ....... *H04W 52/0258* (2013.01); *H04L 1/0002* (2013.01); *H04L 5/0055* (2013.01);
(Continued)

(58) Field of Classification Search
CPC ......... H04W 52/0258; H04W 52/0212; H04W 52/0261; H04W 52/028; H04W 52/0251;
(Continued)

(56) References Cited

U.S. PATENT DOCUMENTS

2016/0127998 A1* 5/2016 Roessel ............. H04W 52/0277
                                                              370/311
2019/0101970 A1* 4/2019 Ge ........................ G06F 1/1698
2020/0351771 A1* 11/2020 Geekie .................. H04W 76/30

FOREIGN PATENT DOCUMENTS

CN          101277490 A        10/2008
CN          102156530 A         8/2011
(Continued)

OTHER PUBLICATIONS

Extended European Search Report for EP Application 20806080.6 mailed May 2, 2022. (13 pages).
(Continued)

*Primary Examiner* — Candal Elpenord
(74) *Attorney, Agent, or Firm* — Young Basile Hanlon & MacFarlane, P.C.

(57) ABSTRACT

Described are a method for controlling the power consumption of a terminal, and a storage medium. The method comprises: obtaining a power consumption rate of the terminal; and in response to the power consumption rate being greater than a power consumption rate threshold, controlling the terminal to disable a dual-connection mode thereof based on a power consumption adjustment strategy; wherein the terminal supports the dual-connection mode; the terminal is configured to communicate with communicates with a first base station and a second base station in the dual-connection mode; the first base station is a primary base station, and the second base station is a secondary base station.

18 Claims, 5 Drawing Sheets

(51) Int. Cl.
| | |
|---|---|
| H04L 5/00 | (2006.01) |
| H04W 24/08 | (2009.01) |
| H04W 24/10 | (2009.01) |
| H04W 28/02 | (2009.01) |
| H04W 28/086 | (2023.01) |
| H04W 36/00 | (2009.01) |
| H04W 36/30 | (2009.01) |
| H04W 48/02 | (2009.01) |
| H04W 48/20 | (2009.01) |
| H04W 60/00 | (2009.01) |
| H04W 60/04 | (2009.01) |
| H04W 76/15 | (2018.01) |
| H04W 76/18 | (2018.01) |
| H04W 76/19 | (2018.01) |
| H04W 76/20 | (2018.01) |
| H04W 76/30 | (2018.01) |
| H04W 76/34 | (2018.01) |
| H04W 84/02 | (2009.01) |
| H04W 88/06 | (2009.01) |
| H04W 88/08 | (2009.01) |
| H04W 92/02 | (2009.01) |
| H04W 92/10 | (2009.01) |

(52) U.S. Cl.
CPC ........... *H04W 24/08* (2013.01); *H04W 24/10* (2013.01); *H04W 28/0278* (2013.01); *H04W 28/0865* (2023.05); *H04W 36/0069* (2018.08); *H04W 36/00698* (2023.05); *H04W 36/0085* (2018.08); *H04W 36/305* (2018.08); *H04W 48/02* (2013.01); *H04W 48/20* (2013.01); *H04W 52/0212* (2013.01); *H04W 52/0261* (2013.01); *H04W 52/028* (2013.01); *H04W 60/005* (2013.01); *H04W 60/04* (2013.01); *H04W 76/15* (2018.02); *H04W 76/18* (2018.02); *H04W 76/19* (2018.02); *H04W 76/20* (2018.02); *H04W 76/30* (2018.02); *H04W 76/34* (2018.02); *H04W 84/02* (2013.01); *H04W 88/06* (2013.01); *H04W 88/08* (2013.01); *H04W 92/02* (2013.01); *H04W 92/10* (2013.01); *Y02D 30/70* (2020.08)

(58) Field of Classification Search
CPC ......... H04W 52/0267; H04W 52/0225; H04W 52/0274; H04W 52/0254; H04W 24/08; H04W 24/10; H04W 28/0278; H04W 28/0865; H04W 36/0069; H04W 36/00698; H04W 36/0085; H04W 36/305; H04W 48/02; H04W 48/20; H04W 48/16; H04W 48/18; H04W 60/005; H04W 60/04; H04W 76/15; H04W 76/18; H04W 76/19; H04W 76/20; H04W 76/30; H04W 76/34; H04W 88/06; H04W 88/08; H04L 92/02; H04W 92/10; H04L 1/0002; H04L 5/0055; Y02D 30/70
USPC ......................................................... 370/252
See application file for complete search history.

(56) References Cited

FOREIGN PATENT DOCUMENTS

| | | |
|---|---|---|
| CN | 105453649 A | 3/2016 |
| CN | 105472667 A | 4/2016 |
| CN | 106879038 A | 6/2017 |
| CN | 107222612 A | 9/2017 |
| CN | 108566672 A | 9/2018 |
| CN | 109151921 A | 1/2019 |
| CN | 109587757 A | 4/2019 |
| CN | 109661016 A | 4/2019 |
| CN | 110536347 A | 12/2019 |
| CN | 110913504 A | 3/2020 |
| CN | 110677869 B | 8/2021 |
| EP | 2983445 A1 | 2/2016 |
| EP | 3016449 A1 | 5/2016 |
| EP | 3462788 A1 | 4/2019 |
| WO | 2019008707 A1 | 1/2019 |
| WO | 2019059673 A1 | 3/2019 |
| WO | 2019062616 A1 | 4/2019 |
| WO | 2019118157 A1 | 6/2019 |
| WO | 2021052244 A1 | 3/2021 |
| WO | 2021115030 A1 | 6/2021 |

OTHER PUBLICATIONS

3GPP TSG RAN Meeting 83 RP-190481; Shenzhen, Guangdong, China, Mar. 18-21, 2019.
International Search Report with English Translation for PCT/CN2020/086163 mailed Jul. 20, 2020.
Chinese Notification to Grant with English Translation for CN Application 201910872915.4 mailed May 14, 2021.
Chinese Second Office Action with English Translation for CN Application 2019108729154 mailed Feb. 7, 2021.
Chinese First Office Action with English Translation for CN Application 201910872915.4 mailed Nov. 24, 2020.
European First Examination report for European Patent Application No. 20806080.6, mailed Apr. 2, 2024, 7 pages.

* cited by examiner

METHOD FOR CONTROLLING POWER CONSUMPTION OF TERMINAL, AND STORAGE MEDIUM

CROSS-REFERENCE TO RELATED APPLICATION(S)

The present application is a continuation-application of International (PCT) Patent Application No. PCT/CN2020/086163, filed on Apr. 22, 2020, which claims foreign priority of Chinese Patent Application No. 201910405971.7, filed on May 16, 2019, and Chinese Patent Application No. 201910872915.4 filed on Sep. 16, 2019, the entire contents of all of which are hereby incorporated by reference.

TECHNICAL FIELD

The present disclosure relates to the field of wireless technologies, and in particular to a method for controlling power consumption of a terminal, and a storage medium.

BACKGROUND

The fifth generation (5G) mobile communication system supports independent networking (Standalone, SA) architecture and non-independent networking (Non-Standalone, NSA) architecture. A typical NSA architecture is a dual-connection (DC) architecture.

In the DC architecture, a terminal can work in a dual-connection mode. In the dual-connection mode, the terminal communicates with two base stations. For example, the terminal communicates with both a long term evolution (LTE) base station and a new radio (NR) base station, resulting in high power consumption of the terminal.

SUMMARY

The present disclosure provides a method for controlling power consumption of a terminal, and a storage medium.

Technical solutions of the present disclosure may be achieved as followed.

Embodiments of the present disclosure provides a method for controlling power consumption of a terminal, comprising: obtaining a power consumption rate of the terminal; and in response to the power consumption rate being greater than a power consumption rate threshold, controlling the terminal to disable a dual-connection mode based on a power consumption adjustment strategy thereof; wherein the terminal supports the dual-connection mode; in the dual-connection mode, the terminal is configured to communicate with a first base station and a second base station; the first base station is a primary base station, and the second base station is a secondary base station.

Embodiments of the present disclosure provides an apparatus for controlling power consumption of a terminal, comprising: a memory, a processor, and a computer program stored in the memory and executable on the processor; wherein the processor is configured to execute the computer program to perform the method for controlling power consumption of a terminal.

Embodiments of the present disclosure provides a non-transitory computer-readable storage medium, storing a computer instruction; wherein the computer instruction is executed by the processor to perform the method for controlling power consumption of a terminal.

DETAILED DESCRIPTION

The present disclosure will be further described in detail below in conjunction with the drawings and specific embodiments.

Figure 1:
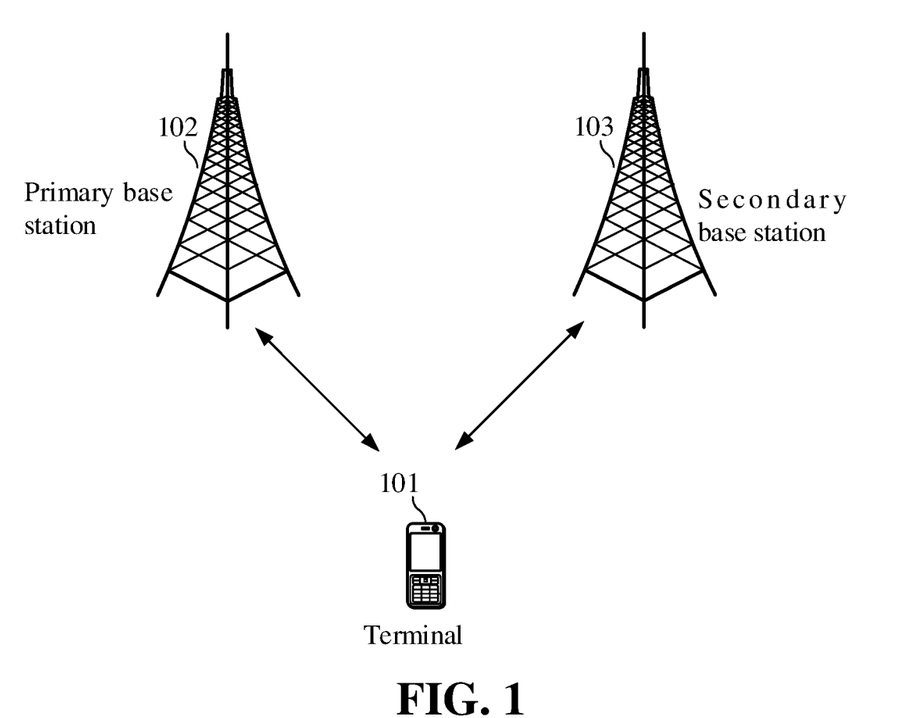
FIG. 1 is a schematic view of a system architecture applied by a method for controlling power consumption of a terminal according to an embodiment of the present disclosure.

FIG. 1 is a schematic view of a system architecture applied by a method for controlling power consumption of a terminal according to an embodiment of the present disclosure. As shown in FIG. 1, the system includes a terminal 101, a primary base station 102, and a secondary base station 103.

The terminal 101 is configured to establish an air interface connection with the primary base station 102 (also referred to as a primary node) to achieve communication with the primary base station 102; the terminal 101 is further configured to establish an air interface connection with the secondary base station 103 (also referred to as a secondary node) to achieve communication with the secondary base station 103; the terminal 101 is further configured to establish an air interface connection with the primary base station 102 and the secondary base station 103 at the same time to achieve communication with the primary base station 102 and the secondary base station 103 at the same time.

In a dual-connection mode, the terminal 101 simultaneously establishes two connections with the primary base station 102 and the secondary base station 103. The primary base station 102 is mainly responsible for transmitting signaling, and the secondary base station 103 is responsible for transmitting data. The technical solutions in the embodiments of the present disclosure are mainly aimed at the terminal in the dual-connection mode.

The types of the primary base station 102 and the secondary base station 103 shown in FIG. 1 may be the same or different. In an example, the primary base station 102 is an LTE base station, and the secondary base station 103 is an NR base station. In another example, the primary base station 102 is an NR base station, and the secondary base station 103 is also an NR base station. In further another example, the primary base station 102 is an NR base station, and the secondary base station 103 is an LTE base station. The embodiments of the present disclosure does not limit the types of the primary base station 102 and the secondary base station 103.

In some embodiments, the dual-connection mode is an EN-DC mode or next generation EN-DC (NGEN-DC) mode. In this case, the primary base station is an LTE base station, the secondary base station is an NR base station, and the terminal communicates with both LTE base station and NR base station.

In other embodiments, the dual-connection mode is NR-evolved UMTS (NR-EUTRA, NE-DC) mode. In this case, the primary base station is an NR base station, the secondary base station is an LTE base station, and the terminal communicates with both LTE base station and NR base station.

It should be noted that the dual-connection mode is not limited to the aforementioned EN-DC mode and NE-DC mode, and the embodiments of the present disclosure does not limit the specific type of the dual-connection mode.

In specific implementation, a deployment mode of the primary base station and the secondary base station may be co-site deployment (for example, NR base station and LTE base station may be arranged on a single physical device), or non-co-site deployment (for example, NR base station and LTE base station may be arranged on different physical devices), which is not limited herein. The LTE base station may also be referred to as an evolved Node B (CNB), and the NR base station may also be referred to as a next generation Node B (gNB). It should be noted that the present disclosure does not limit the relationship between the coverage of the primary base station and the secondary base station, for example, the primary base station and the secondary base station may have overlapped coverage.

The specific type of the terminal 101 is not limited in the present disclosure. It can be any user equipment that supports the dual-connection mode, such as a smart phone, a personal computer, a notebook computer, a tablet computer, a portable wearable device, etc.

Figure 2:
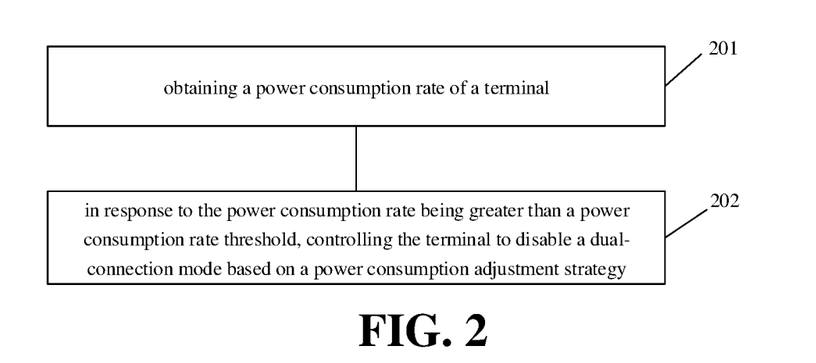
FIG. 2 is a flowchart of a method for controlling power consumption of a terminal according to an embodiment of the present disclosure.

FIG. 2 is a flowchart of a method for controlling power consumption of a terminal according to an embodiment of the present disclosure. As shown in FIG. 2, the method may include operations as followed.

At block 201: obtaining a power consumption rate of a terminal.

The terminal herein supports a dual-connection mode. In the dual-connection mode, the terminal communicates with both a first base station and a second base station; the first base station is a primary base station, and the second base station is a secondary base station.

The power consumption rate of the terminal may refer to power consumption within a preset time period, or may refer to an instantaneous power consumption rate of the terminal at a first moment.

To realize simultaneous communication with the two base stations, the terminal is required to include two sets of communication modules, and the two sets of communication modules respectively correspond to the two base stations. A first modem module and a first radio frequency path (including a first radio frequency circuit and a first radio frequency antenna) form a first communication module set, and the first communication module set corresponds to the first base station. A second modem module and a second radio frequency path (including a second radio frequency circuit and a second radio frequency antenna) form a second communication module set, and the second communication module set corresponds to the second base station. In an example, the first modem module is a 5G modem, the second modem module is a 4G modem, the first radio frequency circuit is 5G RF, and the second radio frequency circuit is 4G RF. In the dual-connection mode, the first communication module and the second communication module work simultaneously.

In practical applications, the terminal may be arranged with a virtual switch. When a user turns on the virtual switch through a touch operation, the terminal determines that it is required to optimize its own power consumption and starts to obtain the power consumption rate of the terminal.

Based on this, in some embodiments, the obtaining the power consumption rate of the terminal may include: detecting whether receiving a first instruction, wherein the first instruction is configured to instruct to reduce the power consumption of the terminal; and obtaining the power consumption rate of the terminal in response to receiving the first instruction.

Figure 3:
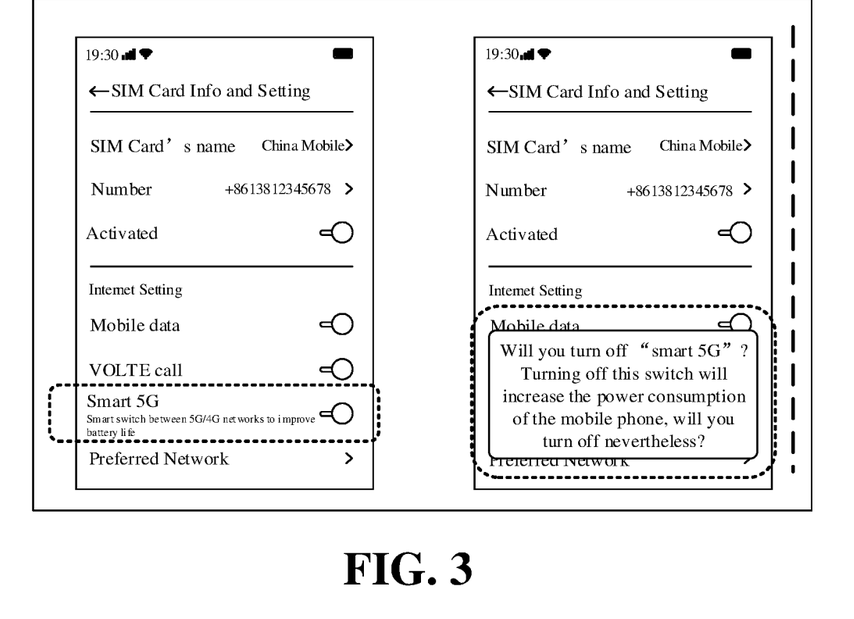
FIG. 3 is a schematic view of a virtual switch arranged in a terminal according to an embodiment of the present disclosure.

For example, as shown in FIG. 3, the terminal may be arranged with the virtual switch such as "smart 5G". When the user turns on the virtual switch through a touch operation, the terminal determines that it is required to optimize its own power consumption, and obtains the power consumption of the terminal within a preset time period. When the user turns off the virtual switch through another touch operation, the terminal may generate a prompt message such as "turning off this switch will increase the power consumption of the mobile phone, will you turn off nevertheless?", and determine whether receiving a confirmation operation for the prompt information. In response to receiving the confirmation operation, the terminal determines that it is not required to optimize its own power consumption.

At block 202: in response to the power consumption rate being greater than a power consumption rate threshold, controlling the terminal to disable a dual-connection mode based on a power consumption adjustment strategy.

Specifically, it may be determined whether the instantaneous power consumption rate of the terminal at the first moment is greater than the power consumption rate threshold; in response to the instantaneous power consumption rate being greater than the power consumption rate threshold, the terminal is controlled to disable the dual-connection mode based on the power consumption adjustment strategy. Alternatively, it may be determined whether a difference in the power consumption of the terminal from a first value to a second value within the preset time period is greater than the power consumption threshold; in response to the difference being greater than the power consumption threshold, the terminal is controlled to disable the dual-connection mode based on the power consumption adjustment strategy.

The power consumption adjustment strategy herein may refer to a strategy that can prevent the terminal from activating the dual-connection mode. The power consumption adjustment strategy herein may also refer to a strategy that can reduce the probability of the terminal activating the dual-connection mode. Specifically, the power consumption adjustment strategy herein may include the following five types.

A first power consumption adjustment strategy: the terminal may send radio capability information to the first base station through a TAU process to prevent the network device from configuring the dual-connection mode, thereby preventing the terminal from activating the dual-connection mode, and finally controlling the terminal to disable the dual-connection mode. The radio capability information is configured to indicate that the terminal does not support access to the second base station.

A second power consumption adjustment strategy: after receiving a measurement request sent by the first base station, the terminal may not respond to the measurement request, or not report the measurement report of the second base station to prevent the network device from configuring the dual-connection mode, thereby preventing the terminal from activating the dual-connection mode, and finally controlling the terminal to disable the dual-connection mode.

A third power consumption adjustment strategy: by updating a measure-report reporting threshold of the second base station to prevent the network device from configuring the dual-connection mode, thereby preventing the terminal from activating the dual-connection mode, and finally controlling the terminal to disable the dual-connection mode.

A fourth power consumption adjustment strategy: by ignoring configuration information sent by the first base station for instructing the configuration of the dual-connection mode, the network device is prevented from configuring the dual-connection mode, thereby preventing the terminal from activating the dual-connection mode, and finally controlling the terminal to disable the dual-connection mode.

A fifth power consumption adjustment strategy: when the current mode of the terminal is the dual-connection mode, the terminal may send SCG failure information to the first base station to prevent the network device from configuring the dual-connection mode, thereby preventing the terminal from activating the dual-connection mode, and finally controlling the terminal to disable the dual-connection mode.

The terminal may perform the dual-connection disable operation through the TAU process. That is, the terminal may perform the TAU process to notify the network device that the terminal determines to disable the dual-connection mode.

In some embodiments, the controlling the terminal to disable the dual-connection mode based on the power consumption adjustment strategy includes: sending radio capability information to the first base station; the radio capability information is configured to indicate that the terminal does not support access to the second base station.

In actual applications, the terminal may apply the first power consumption adjustment strategy to send to the first base station radio capability information indicating that the second base station does not support access, so as to prevent the network device from configuring the dual-connection mode, thereby preventing the terminal from activating the dual-connection mode, and finally controlling the terminal to disable the dual-connection mode.

Based on this, in some embodiments, the sending the radio capability information to the first base station includes: sending a TAU request to the first base station, wherein the TAU request carries first indication information configured to indicate that the terminal is required to update the radio capability information; receiving a capability report indication message sent by the first base station based on the TAU request; and sending the radio capability information to the first base station according to the capability report indication message.

For example, taking the EN-DC mode of 5G NSA as an example, after the terminal is disconnected from the second base station (that is, the NR base station), when the current state of the terminal is in an idle state, the terminal is required to communicate with The LTE base station establishes a radio resource control (RRC) connection and initiate a TAU process to the LTE base station, thereby indicating that the terminal does not support the access of the second base station (that is, the NR base station). When the current state of the terminal is in a connected state, the terminal may directly initiate a TAU process to the LTE base station to indicate that the terminal does not support the access of the second base station (that is, the NR base station). When the current state of the terminal is in the dual connected state, the terminal may send a SCG failure information message to the LTE base station, indicating that the connection between the terminal and the second base station fails, the LTE base station will send dual-connection failure indication information to the terminal, and after the terminal is disconnected with the NR base station, the terminal initiates a TAU process to the LTE base station to indicate that the terminal does not support the access of the second base station (that is, the NR base station). The idle state may mean that the terminal has not established a connection with the primary base station (that is, the LTE base station), and the connected state may mean that the terminal has established a connection with the primary base station (that is, the LTE base station).

The value of the first indication information may include 0 or 1. When the value of the first indication information is 1, it is indicated that the terminal is required to update the radio capability information. When the value the first indication information of is 0, it is indicated that the terminal is not required to update the radio capability information.

Table 1 is a schematic table of the format of the TAU request. As shown in Table 1, the TAU request may carry byte 1, that is, octet1, where URC upd indicates whether the UE radio capability information is required to be updated. The bit position occupied by URC upd in the TAU request is shown in Table 1. As shown in Table 1, URC upd can be the first bit corresponding to the lowest bit in byte 1.

TABLE 1

| 8 | 7 | 6 | 5 | 4 | 3 | 2 | 1 | Byte |
|---|---|---|---|---|---|---|---|------|
| Required to update UE radio capability information IEI | | | | 0 | 0 | 0 | URC upd | octet 1 |
| | | | | | spare | | | |

Table 2 is a schematic table of URC upd values. As shown in Table 2, when the value of URC upd is 0, it is indicated that the UE radio capability information is not required to be updated. When the value of URC upd is 1, it is indicated that the UE radio capability information is required to be updated.

TABLE 2

| (URC upd) (Byte1) | |
|---|---|
| Bit 1 | |
| 0 | UE radio capability information update not needed |
| 1 | UE radio capability information update needed |

In actual applications, in order to further increase the standby time of the terminal, the terminal may also send to the network device indication information, indicating that the terminal returns to the idle state after a tracking area is updated.

Based on this, in some embodiments, the TAU request further carries second indication information; the second indication information is configured to indicate that the state of the terminal returns from the connected state to the idle state after the tracking area is updated.

The idle state may mean that the terminal is disconnected from the first base station, and the connected state may mean that the terminal has established a connection with the first base station.

For example, taking the EN-DC mode of 5G NSA as an example, the second indication information may be configured to indicate that the terminal is disconnected from the LTE base station after the tracking area is updated.

The value of the second indication information may include 0 or 1. When the value of the second indication information is 0, it is indicated that the state of the terminal is required to be returned to the idle state from the connected state after the tracking area is updated. When the value of the second indication information is 1, it is indicated that the state of the terminal is not required to return to the idle state from the connected state after the tracking area is updated.

For example, an "active flag" of the "EPS update type" in the TAU request may be set to 0, indicating that the state of the terminal is required to be returned from the connected state to the idle state after the tracking area is updated.

It should be noted that the second indication information is sent to the network device through the terminal, such that the terminal may return to the idle state as soon as possible after the tracking area update is completed. Since the power consumption of the terminal in the idle state is less than the power consumption in the connected state, the power consumption can be further reduced, thereby increasing the standby time of the terminal.

In actual applications, the terminal may apply the second power consumption adjustment strategy to prevent the network device from configuring the dual-connection mode, thereby preventing the terminal from activating the dual-connection mode, and finally controlling the terminal to disable the dual-connection mode.

Based on this, in some embodiments, the controlling the terminal to disable the dual-connection mode based on the power consumption adjustment strategy includes: receiving a measurement request sent by the first base station, wherein the measurement request is configured to instruct the terminal to measure the second base station; and not responding to the measurement request.

In actual applications, for the EN-DC mode, the measurement request may specifically be an event numbered B1 in which the network device configures LTE to NR for the terminal.

The not responding to the measurement request may mean that the terminal does not perform measurement on the second base station according to the measurement request after receiving the measurement request.

For example, after receiving the measurement request, the terminal may discard the measurement request, that is, not save the measurement request.

It should be noted that, since the terminal does not respond to the measurement request, the terminal may not perform measurement on the second base station, and thus may not obtain the measurement report of the second base station. In this way, the terminal may not send the measurement report to the network device, and the network device may not configure the dual-connection mode according to the measurement report of the second base station reported by the terminal, such that the terminal works in a single-connection mode, and the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

In actual applications, the terminal may apply another power consumption adjustment strategy. After receiving a measurement request sent by the first base station, the terminal does not report the measurement report of the second base station, thereby preventing the network device from configuring the dual-connection mode, thereby preventing the terminal from activating the dual-connection mode, and finally controlling the terminal to disable the dual-connection mode.

Based on this, in some embodiments, the controlling the terminal to disable the dual-connection mode based on the power consumption adjustment strategy includes: receiving a measurement request sent by the first base station, wherein the measurement request is configured to instruct the terminal to measure the second base station; performing measurement on the second base station to obtain a measurement result of the second base station based on the measurement request; sending a measurement report to the network device, wherein the measurement report does not include the measurement result of the second base station.

It should be noted that the terminal does not send the measurement result of the second base station to the network device. In this way, the network device may not configure the dual-connection mode according to the measurement report reported by the terminal, such that the terminal works in the single-connection mode, and the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

In practical applications, the terminal may apply the third power consumption adjustment strategy to prevent the network device from configuring the dual-connection mode, thereby preventing the terminal from activating the dual-connection mode, and finally controlling the terminal to disable the dual-connection mode.

Based on this, in some embodiments, the controlling the terminal to disable the dual-connection mode based on the power consumption adjustment strategy includes: updating, by the terminal, a measure-report reporting threshold of the second base station to a sum of a current measure-report reporting threshold of the second base station and a target value, wherein the target value is a positive integer greater than 1; measuring, by the terminal, the second base station to obtain the measurement report of the second base station; and reporting, by the terminal, the measurement report of the second base station to the first base station based on the updated measure-report reporting threshold of the second base station.

By updating the measure-report reporting threshold of the second base station to the sum of the measure-report reporting threshold of the second base station and the target value, the probability of the terminal reporting the measurement report of the second base station to the network device may be reduced.

For example, assuming that the measure-report reporting threshold of the second base station before the update is 4 and the target value is 2, then the updated measure-report reporting threshold of the second base station is 6. Assuming that the signal quality of the second base station in the measurement report of the second base station obtained by the terminal measurement is 5, since 5 is less than 6, the terminal will not report the measurement report of the second base station to the network device.

The greater the target value, the less the probability that the terminal reports the measurement report of the second base station to the network device. When the target value is greater than or equal to a certain threshold, the probability that the terminal reports the measurement report of the second base station to the network device is 0, that is, the terminal does not report the measurement report of the second base station to the network device.

For example, assuming that the measure-report reporting threshold of the second base station before the update is 4 and the target value is 4, the updated measure-report reporting threshold of the second base station is 8. Assuming that the maximum value of quality of the second base station's channel in the measurement report of the second base station obtained by the terminal is 7, since 7 is less than 8, the terminal does not send the measurement report of the second base station to the network device.

It should be noted that the terminal updates the measure-report reporting threshold of the second base station to the sum of the measure-report reporting threshold of the second base station and the target value, and reports the measurement report of the second base station according to the updated measure-report reporting threshold of the second base station to the first base station, thereby reducing the probability of the terminal reporting the measurement report of the second base station to the network device. Since the network device is required to configure the dual-connection mode according to the measurement report of the second base station reported by the terminal, the probability that the network device configures the dual-connection mode may be reduced by reducing reporting the measurement report of the second base station, and the terminal may actively chooses not to communicate with the second base station in the non-independent network based on the signal quality in the measurement report of the second base station. Compared with the method in the related art that the terminal is required to communicate with the primary base station and the second base station, the power consumption of the terminal to communicate with the two base stations may be reduced, thereby increasing the standby time of the terminal.

In actual applications, the terminal may apply the fourth power consumption adjustment strategy to prevent the network device from configuring the dual-connection mode, thereby preventing the terminal from activating the dual-connection mode, and finally controlling the terminal to disable the dual-connection mode.

Based on this, in some embodiments, the controlling the terminal to disable the dual-connection mode based on the power consumption adjustment strategy includes: receiving configuration information sent by the first base station, wherein the configuration information is configured to indicate a configuration of the dual-connection mode; and not responding to the configuration information.

The terminal receives the configuration information sent by the network device through an RRC link between the network device and the terminal when the terminal is in the single-connection mode and the connected state.

The terminal not responding to the configuration information may mean that the terminal does not activate the dual-connection mode according to the configuration information after receiving the configuration information.

For example, after receiving the configuration information, the terminal may discard the configuration information, that is, not save the configuration information.

It should be noted that the terminal receives the configuration information for configuring the dual-connection mode sent by the network device but does not respond to the configuration information, which enables the terminal to actively choose not to communicate with the second base station in the non-independent networking. Compared with the method in the related art that the terminal is required to communicate with the primary base station and the second base station, the power consumption of the terminal to communicate with the two base stations may be reduced, thereby increasing the standby time of the terminal.

Based on this, in some embodiments, based on the power consumption adjustment strategy, controlling the terminal to disable the dual-connection mode includes: sending SCG failure information to the first base station, wherein the SCG failure information indicates that dual connection fails; receiving a SCG release indication message sent by the first base station; and releasing the dual-connection based on the SCG release indication message.

To prevent that after the terminal releases the dual-connection, the network device reconfigures the dual-connection mode according to the measurement report of the second base station sent by the terminal, the SCG failure information may not include the measurement report of the second base station.

The terminal may receive the SCG release indication message sent by the first base station through an RRC connection reconfiguration message.

After the dual-connection is released, the terminal may return to the single-connection mode from the dual-connection mode and remain in the single-connection mode.

The terminal may not respond to the measurement request or not report the measurement report of the second base station after receiving the measurement request sent by the first base station, after returning from the dual-connection mode to the single-connection mode, thereby preventing the network device from configuring the dual-connection mode, thereby preventing the terminal from activating the dual-connection mode, and finally controlling the terminal to remain in the single-connection mode.

It should be noted that the terminal sends the SCG failure information to the network device, receives the SCG release indication message sent by the network device according to the SCG, and releases the dual-connection according to the SCG release indication message, thereby returning from the dual-connection mode to the single-connection mode, such that the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

In actual applications, the dual-connection mode may be determined to be disabled according to the power consumption rate of the terminal within a preset time period, or the dual-connection mode may be determined to be enabled according to the power consumption rate of the terminal within the preset time period.

Based on this, in some embodiments, the method further includes: in condition of a first parameter not satisfying a preset condition, controlling the terminal to enable the dual-connection mode based on the power consumption adjustment strategy.

Specifically, when it is determined that the power consumption rate is less than or equal to a preset threshold, based on the power consumption adjustment strategy, the terminal may be controlled to enable the dual-connection mode.

The preset thresholds corresponding to controlling the terminal to disable the dual-connection mode and controlling the terminal to enable the dual-connection mode may be the same or different.

The process of controlling the terminal to enable the dual-connection mode based on the power adjustment strategy is similar to the process of controlling the terminal to disable the dual-connection mode, and will not be repeated here.

With the technical solution provided by the embodiments of the present disclosure, when the power consumption rate of the terminal in the preset time period is greater than the preset threshold, based on the power consumption adjustment strategy, the terminal may be controlled to disable the dual-connection mode, thereby preventing the terminal from working in the dual-connection mode which causes the problem of excessive power consumption. In this way, the power consumption of the terminal may be reduced, and the standby time of the terminal may be increased.

The method for controlling power consumption of the terminal in the embodiments of the present disclosure will be described in detail below with reference to specific embodiments.

Figure 4:
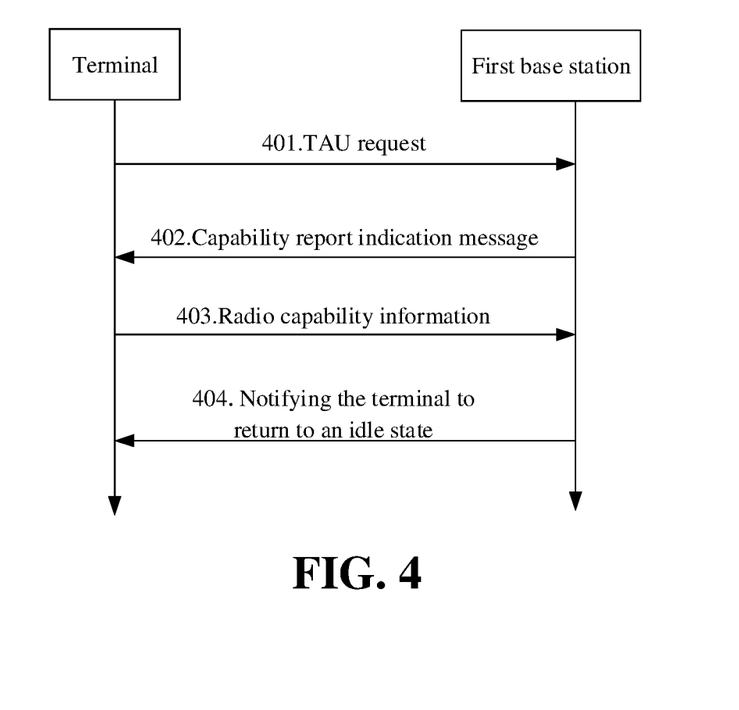
FIG. 4 is a flowchart of a terminal disabling a dual-connection mode through a tracking area update (TAU) process according to an embodiment of the present disclosure.

FIG. 4 is a flowchart of a terminal disabling a dual-connection mode through a tracking area update (TAU) process according to an embodiment of the present disclosure. The method may include operations as followed.

At block 401: sending, by the terminal, a TAU request to the first base station.

The first network is a 5G network (also called NR network), the second network is a 4G network (also called LTE network), the terminal is in LTE mode (single-connection mode), and the terminal communicates with the first base station; the first base station is a primary base station (LTE base station).

When the current state of the terminal is in an idle state, the terminal is required to first establish an RRC connection with the first base station, and then initiate a TAU process to the first base station, thereby indicating that the terminal does not support the access of the second base station. When the current state of the terminal is in a connected state, the terminal may directly initiate a TAU process to the first base station to indicate that the terminal does not support the access of the second base station.

The TAU request carries first indication information configured to indicate that the terminal is required to update radio capability information; the radio capability information is configured to indicate that the terminal does not support the access of the second base station.

For example, the value of URC upd in the TAU request is set to 1, indicating that the terminal is required to update the radio capability information.

The TAU request also carries second indication information; the second indication information is configured to indicate that the state of the terminal returns from the connected state to the idle state after the tracking area is updated.

For example, an "active flag" of the "EPS update type" in the TAU request is set to 0, indicating that the state of the terminal is required to return from the connected state to the idle state after the tracking area is updated. The idle state may mean that the terminal is disconnected from the first base station.

At block 402: sending, by the first base station, a capability report indication message to the terminal based on the TAU request.

At block 403: sending, by the terminal, the radio capability information to the first base station based on the capability report indication message.

After the first base station receives the radio capability information, the first base station does not configure the dual-connection mode for the terminal, thereby controlling the terminal to disable the dual-connection mode.

At block 404: notifying, by the first base station, the terminal to return to an idle state.

The first base station notifies the terminal to return from the connected state to the idle state after the tracking area is updated according to the second indication information.

It should be noted that, when it is determined that the power is less than a preset threshold such as 20%, the terminal informs the first base station by initiating a TAU process that the terminal is required to disable the connection capability with the second base station, thereby remaining in single-connection mode. Although the terminal supports the dual-connection mode, the terminal may actively chooses not to communicate with the second base station in the non-independent network based on the signal quality in the measurement report of the second base station. Compared with the method in the related art that the terminal is required to communicate with the primary base station and the second base station, the power consumption of the terminal to communicate with the two base stations may be reduced, thereby increasing the standby time of the terminal.

In addition, the terminal may return to the idle state as soon as possible after the update of the tracking area is completed. Since the power consumption of the terminal in the idle state is less than the power consumption in the connected state, the power consumption may be further reduced, thereby increasing the standby time of the terminal.

Figure 5:
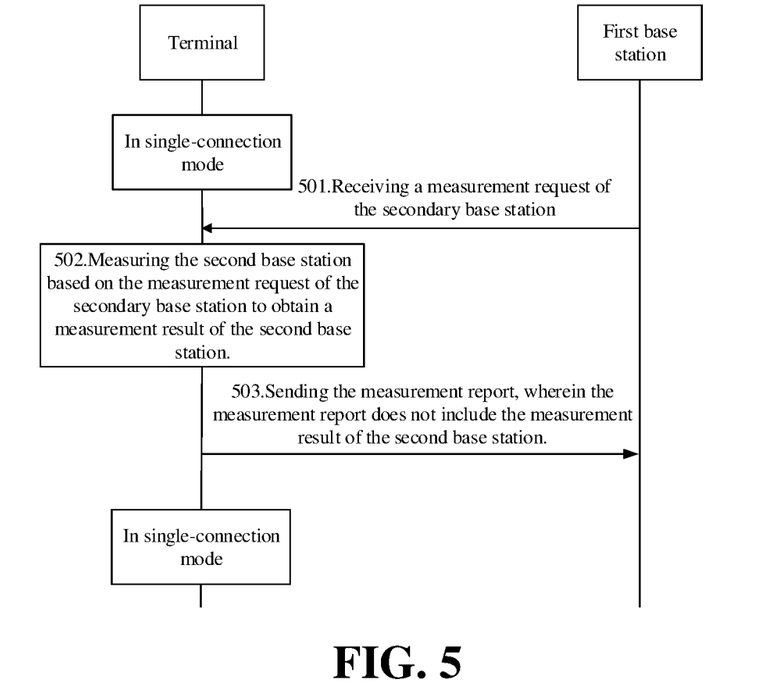
FIG. 5 is a flowchart of a terminal disabling a dual-connection mode by ignoring a measurement request of a secondary base station according to an embodiment of the present disclosure.

FIG. 5 is a flowchart of a terminal disabling a dual-connection mode by ignoring a measurement request of a secondary base station according to an embodiment of the present disclosure. The method may include operations as followed.

At block 501: sending, by the first base station, a measurement request of the second base station to the terminal.

The first network is a 5G network (also called NR network), the second network is a 4G network (also called LTE network), the terminal is in LTE mode (single-connection mode), and the terminal communicates with the first base station; the first base station is a primary base station (LTE base station).

At block 502: measuring, by the terminal, the second base station based on the measurement request of the second base station to obtain a measurement result of the second base station.

The second base station refers to an NR base station.

At block 503: sending the measurement report to the first base station, wherein the measurement report does not include the measurement result of the second base station.

It should be noted that, although the terminal measures the second base station according to the measurement request of the second base station, when the terminal sends the measurement report to the network device, the measurement result of the second base station is not sent to the network device. In this way, the network device may not configure the dual-connection mode according to the measurement result of the second base station reported by the terminal, such that the terminal remains in the single-connection mode, thereby saving the power consumption of the terminal and improving the standby time of the terminal.

Figure 6:
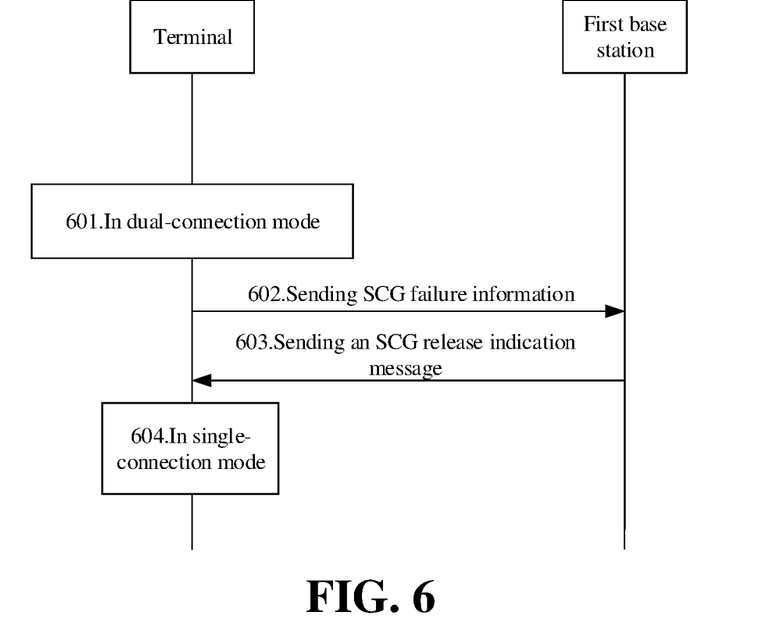
FIG. 6 a flowchart of a terminal disabling a dual-connection mode by sending secondary cell group (SCG) failure information according to an embodiment of the present disclosure.

FIG. 6 a flowchart of a terminal disabling a dual-connection mode by sending secondary cell group (SCG) failure information according to an embodiment of the present disclosure. The method may include operations as followed.

At block 601: configuring the terminal to be in the dual-connection mode currently.

The first network is a 5G network (also called NR network), the second network is a 4G network (also called LTE network), the terminal is in dual-connection mode (EN-DC mode), and the terminal communicates with both the first base station (LTE base station) and the second base station (NR base station).

At block 602: sending, by the terminal, SCG failure information to the first base station.

The terminal may send the SCG failure information to the first base station when its own network connection speed is less than a preset threshold; wherein, the preset threshold may be 20 Mbps.

At block 603: sending, by the first base station, an SCG release indication message to the terminal.

At block 604: releasing, by the terminal, the dual-connection according to the SCG release indication message.

After the dual-connection is released, the terminal may return to the single-connection mode from the dual-connection mode, and remain in the single-connection mode.

The terminal may return to the single-connection mode from the dual-connection mode, and may not respond to the measurement request of the second base station or not report the second base station after receiving the measurement request of the second base station sent by the first base station, thereby preventing the network device from configuring the dual-connection mode, further preventing the terminal from activating the dual-connection mode, and finally controlling the terminal to remain in the single connection mode.

It should be noted that the terminal sends SCG failure information to the network device, receives the SCG release indication message sent by the network device according to the SCG, and releases the dual-connection according to the SCG release indication message, thereby returning from the dual-connection mode to the single-connection mode, such that the terminal actively chooses not to communicate with the second base station in the non-independent network. Compared with the method in the related art that the terminal is required to communicate with the primary base station and the second base station, the power consumption of the terminal to communicate with the two base stations may be reduced, thereby increasing the standby time of the terminal.

Figure 7:
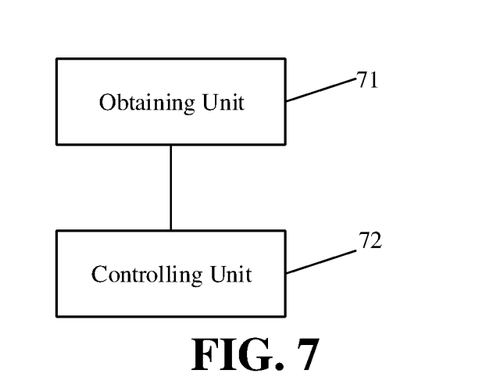
FIG. 7 is a composition structural schematic view of an apparatus for controlling power consumption of a terminal according to an embodiment of the present disclosure.

To implement the method for controlling power consumption of the terminal in the embodiments of the present disclosure, the embodiments of the present disclosure also provides an apparatus for controlling power consumption of a terminal. FIG. 7 is a composition structural schematic view of an apparatus for controlling power consumption of a terminal according to an embodiment of the present disclosure. The apparatus may include:

an obtaining unit 71, configured to obtain a power consumption rate of the terminal; and a control unit 72, configured to, in response to the power consumption rate being greater than a power consumption rate threshold, control the terminal to disable a dual-connection mode based on a power consumption adjustment strategy.

The terminal may refer to a terminal that supports a dual-connection mode. In the dual-connection mode, the terminal communicates with both a first base station and a second base station; the first base station is a primary base station, and the second base station is a secondary base station.

The power consumption rate of the terminal may refer to power consumption within a preset time period, or may refer to an instantaneous power consumption rate of the terminal at a first moment.

In some embodiments, the obtaining unit 71 is specifically configured to: detect whether a first instruction is received, wherein the first instruction is configured to instruct to reduce the power consumption of the terminal; and obtain the power consumption rate of the terminal in response to receiving the first instruction.

In practical applications, in order to prevent that the terminal still communicates with the LTE base station and the NR base station when a short-term power consumption rate is too high, resulting in a sharp drop in the power of the terminal, the network device may not configure the terminal with dual-connection mode. To prevent the network device from configuring the dual-connection mode for the terminal, after determining that the dual-connection mode is disabled, the terminal may send to the network device radio capability information indicating that the terminal does not support the access of the second base station in the network device.

Based on this, in some embodiments, the control unit 72 is specifically configured to: send radio capability information to the first base station, wherein the radio capability information is configured to indicate that the terminal does not support the access of the second base station in the network device.

In some embodiments, the control unit is specifically configured to: send a TAU request to the network device, wherein the TAU request carries first indication information configured to indicate that the terminal is required to update the radio capability information; receive a capability report indication message sent by the first base station based on the TAU request; and send the radio capability information to the first base station according to the capability report indication message.

In practical applications, in order to further increase the standby time of the terminal, the terminal may also send to the network device indication information, indicating that the terminal returns to the idle state after a tracking area is updated.

Based on this, in some embodiments, the TAU request further carries second indication information; the second indication information is configured to indicate that the state of the terminal returns from the connected state to the idle state after the tracking area is updated.

In some embodiments, the control unit 72 is specifically configured to: receive a measurement request sent by a first base station, wherein the measurement request is configured to instruct the terminal to measure the second base station; and not respond to the measurement request.

When the terminal is in the single-connection mode, the terminal may receive the measurement request sent by the first base station.

The not responding to the measurement request may mean that the terminal does not perform measurement on the second base station according to the measurement request after receiving the measurement request.

In some embodiments, the control unit 72 is specifically configured to: update a measure-report reporting threshold of the second base station to a sum of a current measure-report reporting threshold of the second base station and a target value, wherein the target value is a positive integer greater than 1; perform measurement on the second base station to obtain the measurement report of the second base station; and report the measurement report of the second base station to the first base station according to the updated measure-report reporting threshold of the second base station.

By updating the measure-report reporting threshold of the second base station to the sum of the measure-report reporting threshold of the second base station and the target value, the probability of the terminal reporting the measurement report of the second base station to the network device may be reduced.

The greater the target value, the less the probability that the terminal reports the measurement report of the second base station to the network device. When the target value is greater than or equal to a certain threshold, the probability that the terminal reports the measurement report of the second base station to the network device is 0, that is, the terminal does not report the measurement report of the second base station to the network device.

In actual applications, the terminal may perform a dual-connection disable operation by not responding to the configuration information sent by the network device for configuring the dual-connection mode.

Based on this, in some embodiments, the control unit 72 is specifically configured to: receive configuration information sent by the first base station, wherein the configuration information is configured to indicate the configuration of the dual-connection mode; and not respond to the configuration information.

The terminal not responding to the configuration information may mean that the terminal does not activate the dual-connection mode according to the configuration information after receiving the configuration information.

In actual applications, the dual-connection mode may be determined to be disabled according to the power consumption rate of the terminal within a preset time period, or the dual-connection mode may be determined to be enabled according to the power consumption rate of the terminal within the preset time period.

Based on this, in some embodiments, the control unit 72 is further configured to control the terminal to enable the dual-connection mode based on a power adjustment strategy when it is determined that the power consumption rate is less than or equal to a preset threshold.

The preset thresholds corresponding to the determination to disable the dual-connection mode and the determination to enable the dual-connection mode may be the same or different.

The process of controlling the terminal to enable the dual-connection mode based on the power adjustment strategy is similar to the process of controlling the terminal to disable the dual-connection mode, and will not be repeated here.

In practical applications, the obtaining unit 71 and the control unit 72 may be implemented by a processor in the apparatus for controlling power consumption of the terminal.

It should be noted that when the apparatus for controlling power consumption of the terminal provided in the above embodiments performs controlling, only the division of the above program modules is used for illustration. In actual applications, the above processing can be allocated by different program modules according to needs. That is, the internal structure of the apparatus may be divided into different program modules to complete all or part of the processing described above. In addition, the apparatus for controlling power consumption of the terminal provided in the above embodiments belongs to the same concept as the embodiments of the method for controlling power consumption of the terminal. For the specific implementation process, reference may be made to the method embodiments, which will not be repeated herein.

Figure 8:
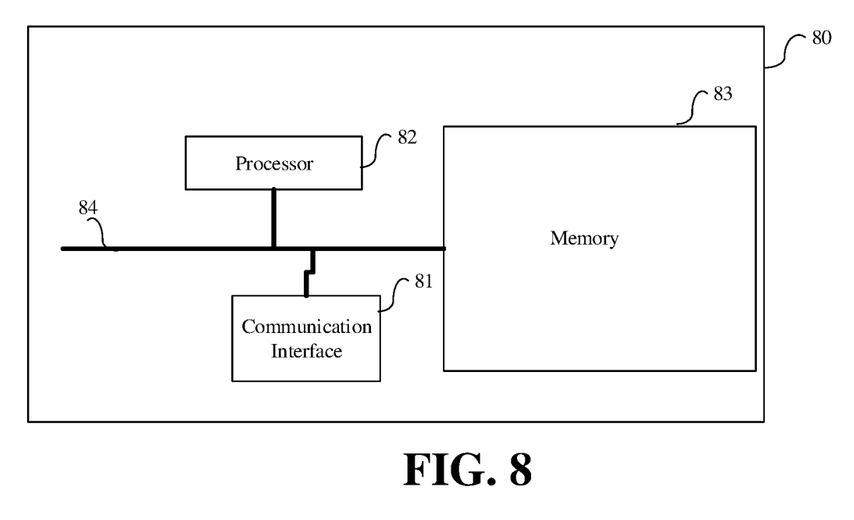
FIG. 8 is a composition structural schematic view of an apparatus for controlling power consumption of a terminal according to another embodiment of the present disclosure.

An embodiment of the present disclosure also provides an apparatus for controlling power consumption of a terminal. As shown in FIG. 8, the apparatus 80 includes a communication interface 81, a processor 82, and a memory 83.

The communication interface 81 is configured to exchange information with other devices.

The processor 82 is connected to the communication interface 81 and is configured to execute the method provided by one or more technical solutions on the smart device side when running a computer program. The computer program is stored in the memory 83.

Of course, in actual applications, the various components in the apparatus 80 are coupled together through a bus system 84. It can be understood that the bus system 84 is configured to implement connection and communication between these components. In addition to a data bus, the bus system 84 also includes a power bus, a control bus, and a state signal bus. However, for clarity of description, various buses are marked as the bus system 84 in FIG. 8.

The memory 83 in the embodiment of the present disclosure is configured to store various types of data to support the operation of the apparatus 80. Examples of the data include: any computer program for operating on the apparatus 80.

The methods disclosed in the foregoing embodiments of the present disclosure may be applied to the processor 82 or implemented by the processor 82. The processor 82 may be an integrated circuit chip with signal processing capability. In the implementation process, each step of the above method can be completed by an integrated logic circuit of hardware in the processor 82 or instructions in the form of software. The processor 82 may be a general-purpose processor, a digital signal processor (DSP), or other programmable logic devices, discrete gates or transistor logic devices, discrete hardware components, etc. The processor 82 can implement or execute the methods, steps, and logical block diagrams disclosed in the embodiments of the present disclosure. The general-purpose processor may be a microprocessor or any conventional processor. The steps of the method disclosed in the embodiments of the present disclosure can be directly embodied as being executed and completed by a hardware decoding processor, or executed and completed by a combination of hardware and software modules in the decoding processor. The software module may be located in a storage medium, and the storage medium is located in the memory 83. The processor 82 reads the information in the memory 83 and completes the steps of the foregoing method in combination with its hardware.

In some embodiments, the apparatus 80 may be implemented by one or more application specific integrated circuits (ASIC), DSPs, programmable logic device (PLD), complex programmable logic devices (CPLD), field-programmable gate arrays (FPGA), general-purpose processors, controllers, microcontroller units (MCU), microprocessors, or other electronic components to perform the above method.

It can be understood that the memory 83 in the embodiments of the present disclosure may be a volatile memory or a non-volatile memory, and may also include both volatile and non-volatile memory. The non-volatile memory may be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, disc, or compact disc read-only memory (CD-ROM); the magnetic surface memory may be magnetic disk storage or tape storage. The volatile memory may be a random access memory (RAM) configured as an external cache. By way of exemplary but not restrictive description, many forms of RAM are available, such as static random access memory (SRAM), synchronous static random access memory (SSRAM), dynamic random access Memory (DRAM), synchronous dynamic random access memory (SDRAM), double data rate synchronous dynamic random access memory (DDRSDRAM), enhanced synchronous dynamic random access memory (ESDRAM), SyncLink connection dynamic random access memory (SLDRAM), and direct rambus random access memory (DRRAM). The memory described in the embodiments of the present disclosure is intended to include, but is not limited to, these and any other suitable types of memories.

It should be noted that: "first", "second", etc. are to distinguish similar objects, and not necessarily to describe a specific order or sequence.

In the several embodiments provided in the present disclosure, it should be understood that the disclosed apparatus and method may be implemented in other ways. The apparatus embodiments described above are merely illustrative. For example, the division of the units is only a logical function division, and there may be other divisions in actual implementation, such as: multiple units or components can be combined or can be integrated into another system, or some features can be ignored or not implemented. In addition, the coupling, or direct coupling, or communication connection between the components shown or discussed may be indirect coupling or communication connection through some interfaces, devices or units, and may be electrical, mechanical or other forms of.

The units described above as separate components may or may not be physically separate, and the components displayed as units may or may not be physical units, that is, they may be located in one place or distributed on multiple network units. Some or all of the units can be selected according to actual needs to achieve the purpose of the solution of the embodiments.

In addition, the functional units in the embodiments of the present disclosure can be all integrated into one processing module, or each unit can be individually used as a unit, or two or more units can be integrated into one unit; The unit can be implemented in the form of hardware, or in the form of hardware plus software functional units. Those skilled in the art can understand that all or part of the steps in the above method embodiments can be implemented by a program instructing relevant hardware. The program can be stored in a computer readable storage medium. When the program is executed, operations including the steps of the method embodiments are executed. The storage medium includes: various media that can store program codes, such as a mobile storage device, ROM, RAM, magnetic disk, or optical disk.

The methods disclosed in the several method embodiments provided in the present disclosure can be combined arbitrarily without conflict to obtain new method embodiments.

The features disclosed in the several product embodiments provided in the present disclosure can be combined arbitrarily without conflict to obtain new product embodiments.

The features disclosed in the several method or apparatus embodiments provided in the present disclosure can be combined arbitrarily without conflict to obtain a new method embodiment or device embodiment.

The above are only specific implementations of the present disclosure, but the scope of the present disclosure is not limited to this. Those skilled in the art can easily think of changes or substitutions within the technical scope disclosed in the present disclosure, which should be covered within the scope of the present disclosure. Therefore, the scope of the present disclosure should be subject to the scope of the claims.

What is claimed is:

1. A method for controlling power consumption of a terminal, comprising:
    obtaining a power consumption rate of the terminal; and
    in response to the power consumption rate being greater than a power consumption rate threshold, controlling the terminal to disable a dual-connection mode based on a power consumption adjustment strategy;
    wherein the terminal is configured to communicate with a first base station and a second base station in the dual-connection mode; the first base station is a primary base station, and the second base station is a secondary base station,
    wherein the controlling the terminal to disable the dual-connection mode based on the power consumption adjustment strategy comprises:
        sending radio capability information to the first base station, wherein the radio capability information is configured to indicate that the terminal does not support accessing the second base station;
    wherein the sending the radio capability information to the first base station comprises:
        sending a tracking area update (TAU) request to the first base station, wherein the TAU request carries first indication information configured to indicate that the terminal is required to update the radio capability information;
        receiving a capability report indication message sent by the first base station; and
        sending the radio capability information to the first base station.

2. The method according to claim 1, wherein the obtaining the power consumption rate of the terminal, comprises:
    obtaining the power consumption rate of the terminal in response to receiving a first instruction, wherein the first instruction is configured to instruct to reduce the power consumption of the terminal.

3. The method according to claim 1, wherein the obtaining the power consumption rate of the terminal, comprises:
    obtaining power consumption within a preset time period; or
    obtaining an instantaneous power consumption rate of the terminal at a first moment.

4. The method according to claim 1, wherein the controlling the terminal to disable the dual-connection mode based on the power consumption adjustment strategy, comprises:
    receiving a measurement request sent by the first base station, wherein the measurement request is configured to instruct the terminal to measure the second base station; and
    refraining from responding to the measurement request.

5. The method according to claim 1, wherein the controlling the terminal to disable the dual-connection mode based on the power consumption adjustment strategy, comprises:
receiving a measurement request sent by the first base station, wherein the measurement request is configured to instruct the terminal to measure the second base station;
performing measurement for the second base station, and obtaining a measurement result of the second base station; and
sending a measurement report to the first base station, wherein the measurement report does not comprise the measurement result of the second base station.

6. The method according to claim 1, wherein the controlling the terminal to disable the dual-connection mode based on the power consumption adjustment strategy, comprises:
sending secondary-cell-group (SCG) failure information to the first base station, wherein the SCG failure information indicates a dual connection fails;
receiving a SCG release indication message sent by the first base station; and
releasing the dual connection.

7. The method according to claim 1, further comprising:
in response to the power consumption rate being less than or equal to the power consumption rate threshold, controlling the terminal to enable the dual-connection mode based on the power consumption adjustment strategy.

8. The method according claim 1, wherein the TAU request further carries second indication information configured to indicate that a state of the terminal returns from a connected state to an idle state after a tracking area is updated; the idle state indicates that the terminal is disconnected from the first base station, and the connected state indicates that the terminal has established a connection with the first base station.

9. The method according to claim 1, wherein the controlling the terminal to disable the dual-connection mode based on the power consumption adjustment strategy, comprises:
updating a measure-report reporting threshold of the second base station to a sum of a current measure-report reporting threshold of the second base station and a target value, wherein the target value is a positive integer greater than 1;
measuring the second base station, and obtaining a measurement report of the second base station; and
reporting the measurement report of the second base station to the first base station based on the updated measure-report reporting threshold of the second base station.

10. The method according to claim 1, wherein the controlling the terminal to disable the dual-connection mode based on the power consumption adjustment strategy, comprises:
receiving configuration information sent by the first base station, wherein the configuration information is configured to indicate a configuration of the dual-connection mode; and
refraining from responding to the configuration information.

11. An apparatus for controlling power consumption of a terminal, comprising: a memory, a processor, and a computer program stored in the memory and executable on the processor; wherein the processor is configured to execute the computer program to perform:
obtaining a power consumption rate of the terminal; and
in response to the power consumption rate being greater than a power consumption rate threshold, controlling the terminal to disable a dual-connection mode based on a power consumption adjustment strategy;
wherein the terminal is configured to communicate with a first base station and a second base station in the dual-connection mode; the first base station is a primary base station, and the second base station is a secondary base station,
wherein the controlling the terminal to disable the dual-connection mode based on the power consumption adjustment strategy comprises:
sending radio capability information to the first base station, wherein the radio capability information is configured to indicate that the terminal does not support accessing the second base station;
wherein the sending the radio capability information to the first base station comprises:
sending a tracking area update (TAU) request to the first base station, wherein the TAU request carries first indication information configured to indicate that the terminal is required to update the radio capability information;
receiving a capability report indication message sent by the first base station; and
sending the radio capability information to the first base station.

12. The apparatus according to claim 11, wherein the obtaining the power consumption rate of the terminal, comprises:
obtaining the power consumption rate of the terminal in response to receiving a first instruction, wherein the first instruction is configured to instruct to reduce the power consumption of the terminal.

13. The apparatus according to claim 11, wherein the obtaining the power consumption rate of the terminal, comprises:
obtaining power consumption within a preset time period; or
obtaining an instantaneous power consumption rate of the terminal at a first moment.

14. The apparatus according to claim 11, wherein the controlling the terminal to disable the dual-connection mode based on the power consumption adjustment strategy, comprises:
receiving a measurement request sent by the first base station, wherein the measurement request is configured to instruct the terminal to measure the second base station; and
refraining from responding to the measurement request.

15. The apparatus according to claim 11, wherein the controlling the terminal to disable the dual-connection mode based on the power consumption adjustment strategy, comprises:
receiving a measurement request sent by the first base station, wherein the measurement request is configured to instruct the terminal to measure the second base station;
performing measurement on the second base station, and obtaining a measurement result of the second base station; and
sending a measurement report of the second base station to the first base station, wherein the measurement report does not comprise the measurement result of the second base station.

16. The apparatus according to claim 11, wherein the controlling the terminal to disable the dual-connection mode based on the power consumption adjustment strategy, comprises:
- sending secondary-cell-group (SCG) failure information to the first base station, wherein the SCG failure information indicates a dual connection fails;
- receiving a SCG release indication message sent by the first base station; and
- releasing the dual connection.

17. The apparatus according to claim 11, further comprising:
- in response to the power consumption rate being less than or equal to the power consumption rate threshold, controlling the terminal to enable the dual-connection mode based on the power consumption adjustment strategy.

18. A non-transitory computer-readable storage medium, storing a computer instruction; wherein the computer instruction is executed by a processor to perform:
- obtaining a power consumption rate of a terminal; and
- in response to the power consumption rate being greater than a power consumption rate threshold, controlling the terminal to disable a dual-connection mode based on a power consumption adjustment strategy;

wherein the terminal is configured to communicate with a first base station and a second base station in the dual-connection mode; the first base station is a primary base station, and the second base station is a secondary base station, wherein the controlling the terminal to disable the dual-connection mode based on the power consumption adjustment strategy comprises:
- sending radio capability information to the first base station, wherein the radio capability information is configured to indicate that the terminal does not support accessing the second base station;

wherein the sending the radio capability information to the first base station comprises:
- sending a tracking area update (TAU) request to the first base station, wherein the TAU request carries first indication information configured to indicate that the terminal is required to update the radio capability information;
- receiving a capability report indication message sent by the first base station; and
- sending the radio capability information to the first base station.

* * * * *